Oct. 22, 1929.    M. A. POSSONS    1,732,910
COMBINED BROILER AND ROASTING PAN
Filed Aug. 7, 1928    3 Sheets-Sheet 1
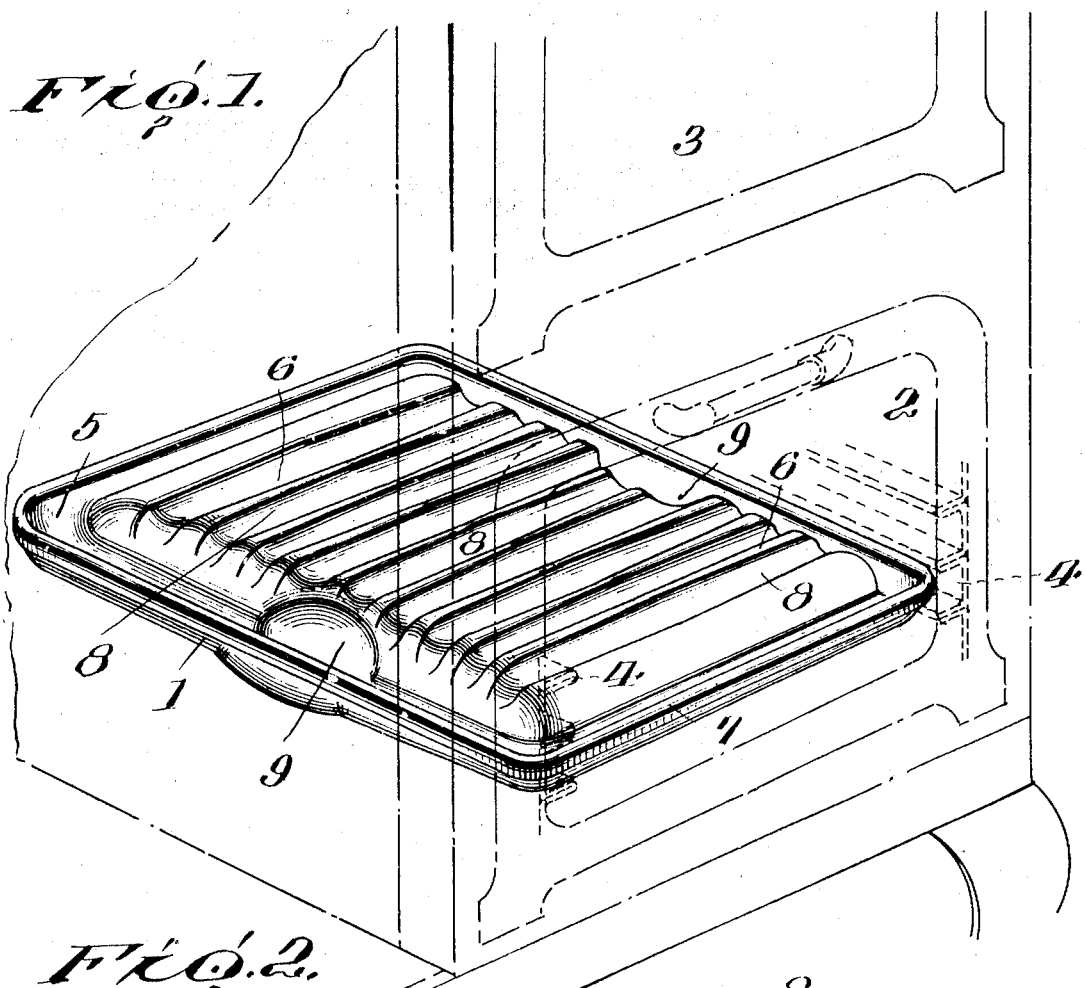
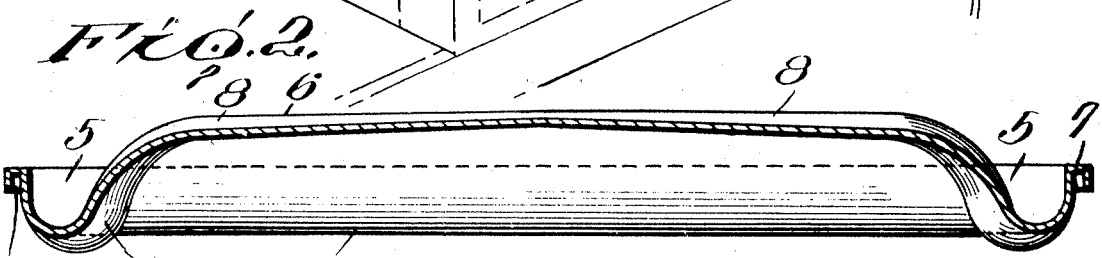
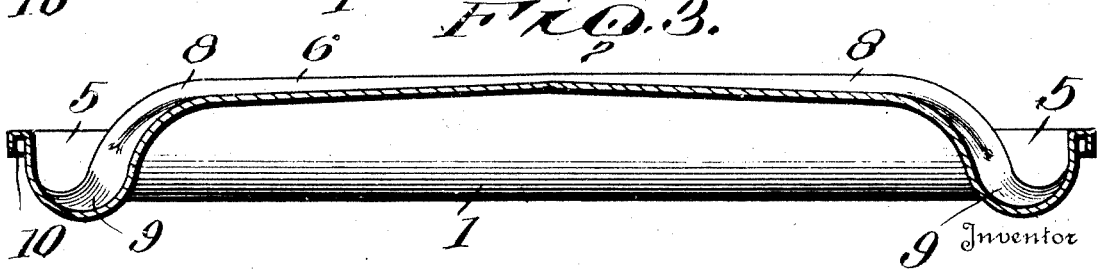
Inventor
M. A. Possons,
By A. S. Pattison
Attorneys Oct. 22, 1929.  M. A. POSSONS  1,732,910

COMBINED BROILER AND ROASTING PAN

Filed Aug. 7, 1928  3 Sheets-Sheet 2

Inventor
M. A. Possons,
By A. S. Pattismohr,
Attorneys

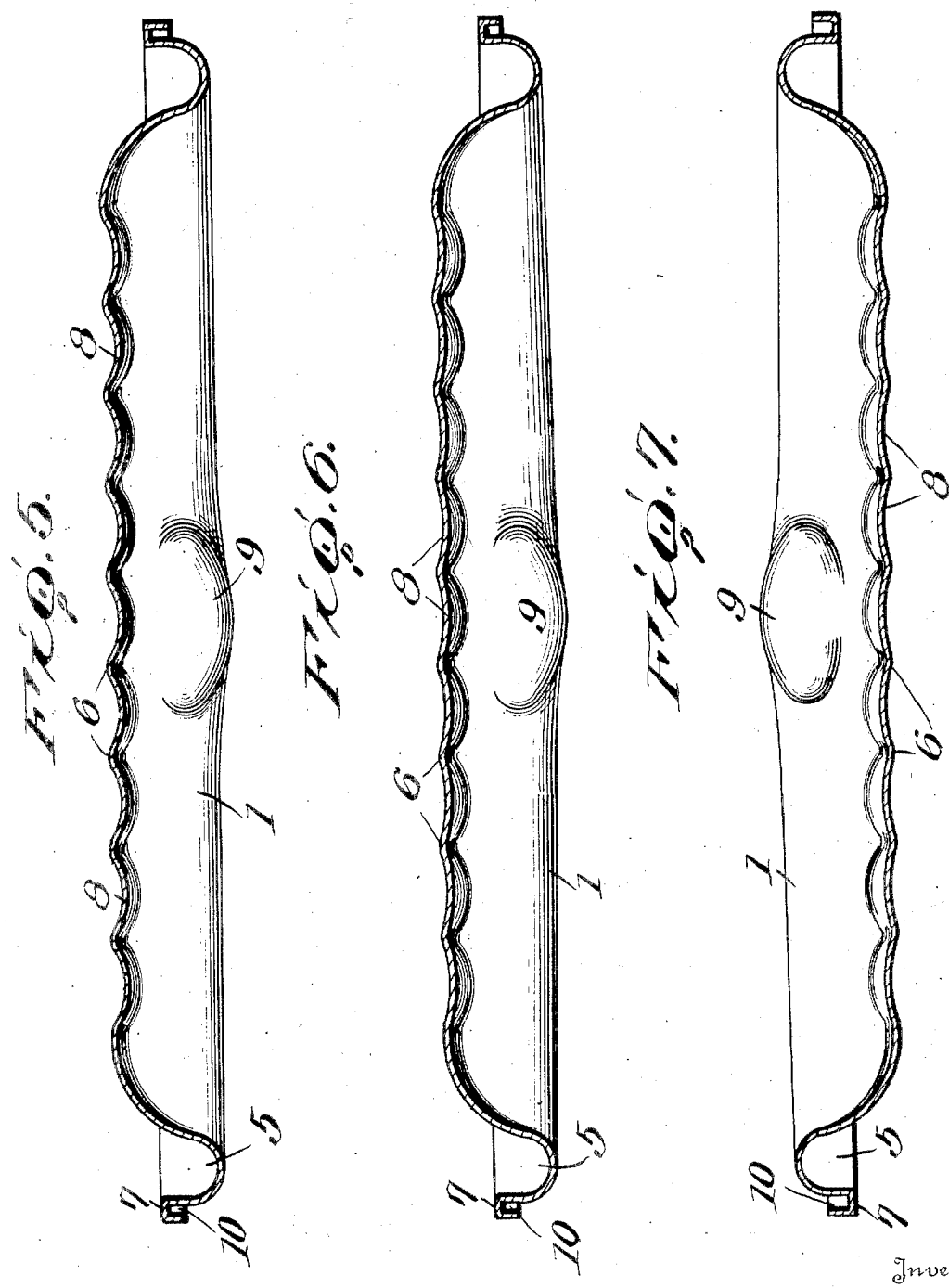

Patented Oct. 22, 1929

1,732,910

UNITED STATES PATENT OFFICE

MINARD A. POSSONS, OF CLEVELAND, OHIO, ASSIGNOR TO AMERICAN STOVE COMPANY, OF ST. LOUIS, MISSOURI, A CORPORATION OF NEW JERSEY

COMBINED BROILER AND ROASTING PAN

Application filed August 7, 1928. Serial No. 297,938.

This invention pertains to a combined broiler and roasting pan and the primary object of the invention is to so construct the pan that it is reversible, whereby when in one position it is adapted to be used as a broiling pan and by reversing the said pan it is adapted to be used as a roasting pan.

When the pan is in the position to be used as a broiling pan it projects upward and has a plurality of parallel corrugations forming intervening ribs and which stop before they reach the periphery of the pan forming a depression or gutter in which the grease from the object being broiled flows, the said corrugations being of such form as to cause the grease to drain in opposite directions to the surrounding depression or groove, and substantially centrally arranged is an enlargement of this groove to receive an ordinary spoon for removing the said grease.

When the pan is used as a roasting pan is reversed, forming a depressed pan to receive the object, the previously mentioned corrugations acting also as a drain for the grease from the roast.

When the pan is used as a broiling pan, it fits on the supporting ribs thereof and one object is to drain the grease to prevent it catching fire which is ordinarily the case.

Other objects of the invention will appear hereinafter.

In the accompanying drawings:

Figure 1 is a perspective view showing my improved broiling and roasting pan in position in a broiling oven, which is shown in dotted lines.

Fig. 2 is a sectional view taken on the line 2—2 of Figure 4.

Fig. 3 is a sectional view taken on the line 3—3 of Figure 4.

Fig. 5 is a sectional view taken on the line 5—5 of Figure 4.

Fig. 6 is a sectional view taken on the dotted line 6—6 of Figure 4.

Fig. 7 is a view showing the pan in a reversed position from that shown in Fig. 6, for roasting purposes.

Figure 4:
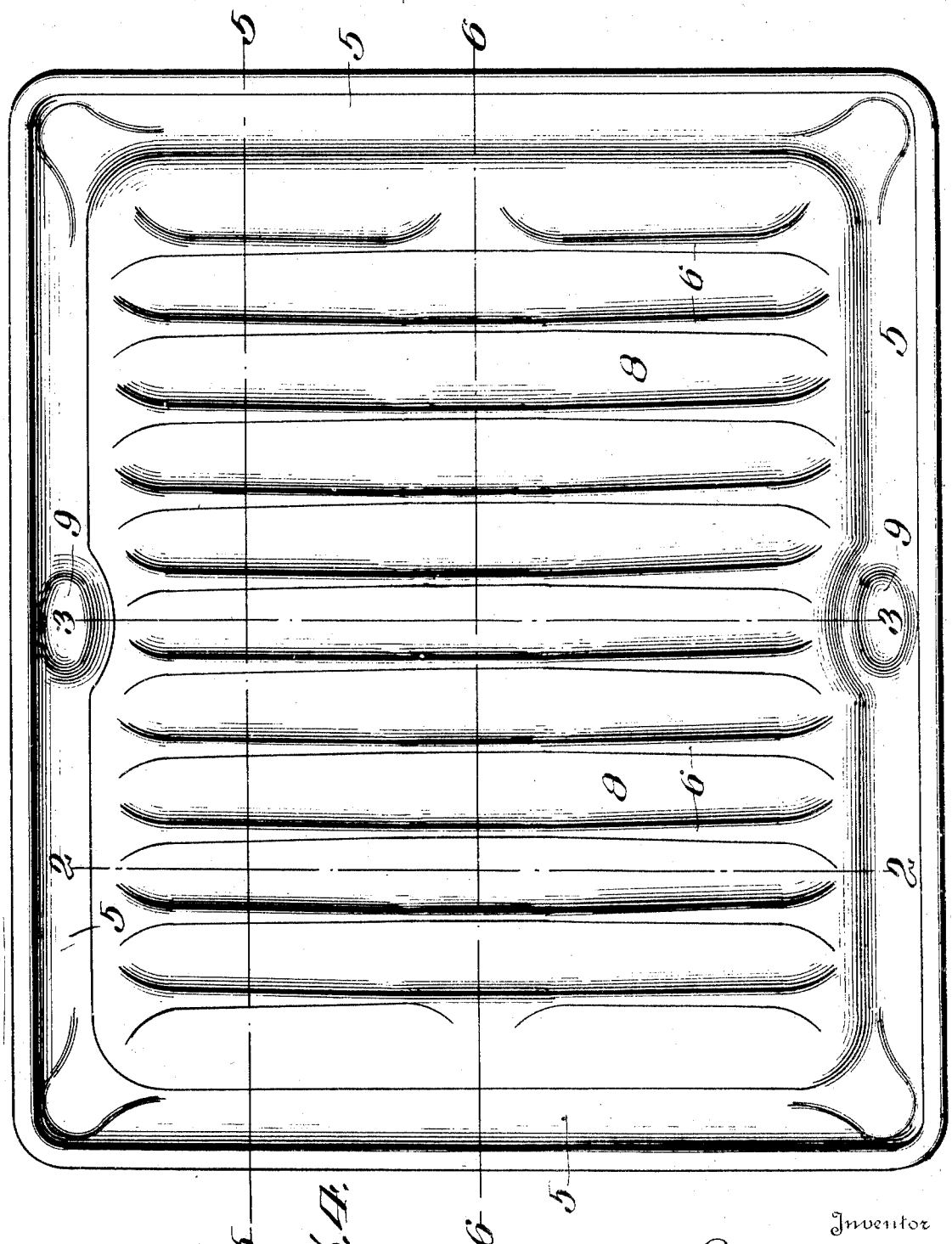
Fig. 4 is a top plan view of my improved combined broiling and roasting pan.

Referring now to the drawings, 1 indicates my improved combined broiling and roasting pan. This improved pan is made of a width that enables it to be placed either in the broiling oven 2, or roasting oven 3, the same resting on the usual supporting ribs 4, thus obviating any use of the usual removable rack for supporting the said pan.

When the pan is in the broiling oven, it is in the position shown in Figs. 1 to 4 inclusive and 5 and 6, and it is in position for broiling the object, there being certain advantages which will hereinafter be pointed out.

When the pan is to be used as a roasting pan, it is placed in the oven 3 and it is reversed, that is to say, it will be turned over so that a roasting pan will be provided. This improved pan preferably has its two sides enameled, whereby it is better adapted for the two purposes above mentioned.

It will be noted that when the pan is in the position shown in Fig. 1, it has a surrounding depression or gutter 5, and it has also a plurality of parallel upwardly extending ribs or corrugations 6. Preferably these corrugations are made considerably higher than the surrounding rim 7 of the pan. The object being broiled is placed on the ribs 6 and the intermediate corrugation 8 is made shallower at the center and gradually deepens on both sides thereof until the corrugation communicates with the said trough.

The preferable object of this construction is that when the steaks, or chops, or fowl, or fish are being broiled, the grease substantially instantly drains from beneath the steak and runs into the surrounding groove 5, whereby the grease can be dipped from the said groove. I find by this construction the grease does not catch fire as happens in the ordinary flat bottom pan. When the pan is used for broiling, I preferably form enlarged depressions 9, formed in the groove 5, and preferably located about midway the pan. This enlargement is to receive the ordinary spoon for removing the accumulated grease from said groove.

It will be observed that the said groove 5 gradually depresses to the enlargement 9, whereby all the grease accumulates in that depression.

When the pan is used as a roasting pan, it is in the reversed position shown in Fig. 7, and the pan is then placed in the upper oven. In this position the object being roasted rests in the bottom of the said pan and the pan and the roast are not subjected immediately to the flame of the burner as is the case when the pan is being used as a broiling pan, and, therefore, the pan is farther from the fire and the grease accumulating in the bottom of the pan does not catch fire.

The extreme surrounding edge of the pan is preferably finished by a U-shaped edge 10, for the purpose of obviating an exposed edge of the metal with which the person handling it would be liable to injury.

Modifications may be made in the form of the construction without departing from the present invention, so long as the construction defined in the accompanying claims is present.

Having thus described my invention, what I claim and desire to secure by Letters Patent is:

1. A cooking pan having a surrounding channel located in a horizontal position, an upwardly projecting central portion extending in a direction of a plane passing through the top edge of the channel said central portion having relatively shallow corrugations draining to the said channel whereby a broiler is formed when the device is turned with the open side of the channel upwards and a relatively deep pan is formed by the inner wall of the channel when the device is reversed.

2. A combined broiling and roasting pan when in one position having a surrounding channel located in a horizontal plane, an upwardly projecting central portion extending upward from the inner wall of the channel, said projecting central portion having shallow corrugations draining into the said channel, whereby a broiler is formed when the device is turned with the open side of the channel upwards and a relatively deep pan is formed by the channel when the device is reversed.

3. A combined broiling and roasting pan having a surrounding channel adapted to rest in a horizontal plane when in one position, an upwardly projecting central portion extending from the inner wall of the channel, said upwardly projecting portion provided with relatively shallow corrugations draining into the said channel and the channel having depressed dipping enlargements, whereby a broiler is formed when the device is turned with the open side of the channel upwards and a relatively deep pan is formed by the channel when the device is reversed for roasting.

In testimony whereof I hereunto affix my signature.

MINARD A. POSSONS.